(12) United States Patent
Oh et al.

(10) Patent No.: US 10,207,702 B2
(45) Date of Patent: Feb. 19, 2019

(54) SYSTEM AND METHOD OF CONTROLLING SHIFT FOR HYBRID ELECTRIC VEHICLE

(71) Applicants: Hyundai Motor Company, Seoul (KR); Kia Motors Corporation, Seoul (KR)

(72) Inventors: Jongbum Oh, Gyeongg-do (KR); Hye Kil Hwang, Gyeonggi-do (KR); Kyung Hun Hwang, Gyeonggi-do (KR); Sang Don Lee, Gyeonggi-do (KR); Hongchul Shin, Gyeonggi-do (KR); Kwonchae Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 63 days.

(21) Appl. No.: 15/656,186

(22) Filed: Jul. 21, 2017

(65) Prior Publication Data
US 2018/0162367 A1    Jun. 14, 2018

(30) Foreign Application Priority Data

Dec. 13, 2016  (KR) .................. 10-2016-0169807

(51) Int. Cl.
*B60W 20/30* (2016.01)
*B60K 6/46* (2007.10)
(Continued)

(52) U.S. Cl.
CPC .............. *B60W 20/30* (2013.01); *B60K 6/46* (2013.01); *B60K 6/547* (2013.01); *B60W 40/00* (2013.01);
(Continued)

(58) Field of Classification Search
CPC .............. B60W 20/30; B60W 40/00; B60W 2510/244; B60W 2510/0657;
(Continued)

(56) References Cited

U.S. PATENT DOCUMENTS 5,984,034 A * 11/1999 Morisawa ................ B60K 6/48
                                                     180/65.28
8,348,806 B2 * 1/2013 Baino .................... B60K 6/387
                                                       477/15

(Continued)

FOREIGN PATENT DOCUMENTS

JP        3514017 B2    3/2004
JP        5892245 B2    3/2016
KR    10-2014-0048579 A  4/2014

*Primary Examiner* — Mussa A Shaawat
(74) *Attorney, Agent, or Firm* — Mintz Levin Cohn Ferris Glovsky and Popeo, P.C.; Peter F. Corless

(57) ABSTRACT

A system and a method of controlling a hybrid electric vehicle shift are disclosed. The system includes an engine and a drive motor operating as power sources and a transmission receiving driving torque from one of the engine and the drive motor. A data detector detects a state data for operating the transmission. A vehicle controller calculates a creep torque and an engine setting torque using the state data, determines whether a shift control condition is satisfied based on a position value of an accelerator pedal, calculates an available motor torque using a motor speed at an actual shift start point and a target motor speed when the shift control condition is satisfied, and calculates a first shift input torque using the creep torque, the engine setting torque, the available motor torque, and a first torque apply ratio. The transmission is operated based on the first shift input torque.

16 Claims, 5 Drawing Sheets

(51) Int. Cl.
  *B60K 6/547* (2007.10)
  *B60W 40/00* (2006.01)
(52) U.S. Cl.
  CPC ............... *B60W 2510/0657* (2013.01); *B60W 2510/081* (2013.01); *B60W 2510/082* (2013.01); *B60W 2510/083* (2013.01); *B60W 2510/1005* (2013.01); *B60W 2510/1025* (2013.01); *B60W 2510/244* (2013.01); *B60W 2540/10* (2013.01); *B60W 2550/142* (2013.01); *B60W 2710/1005* (2013.01); *B60Y 2200/92* (2013.01); *B60Y 2300/18058* (2013.01); *B60Y 2300/70* (2013.01); *Y10S 903/919* (2013.01); *Y10S 903/945* (2013.01)
(58) Field of Classification Search
  CPC ........ B60W 2510/083; B60W 2540/10; B60K 6/46; B60K 6/547; Y10S 903/945; Y10S 903/919; B60Y 2300/70; B60Y 2200/92; B60Y 2300/18058
  See application file for complete search history.

(56) References Cited

U.S. PATENT DOCUMENTS

| | | | | |
|---|---|---|---|---|
| 9,321,456 B2* | 4/2016 | Takamura | ............... | B60K 6/48 |
| 9,937,925 B2* | 4/2018 | Cho | ................... | B60K 6/48 |
| 2002/0035006 A1* | 3/2002 | Suzuki | ................. | B60K 6/365 |
| | | | | 477/3 |
| 2005/0103544 A1* | 5/2005 | Takami | ................. | B60K 6/365 |
| | | | | 180/65.235 |
| 2012/0053768 A1* | 3/2012 | Jeon | ................... | B60K 6/48 |
| | | | | 701/22 |
| 2013/0311027 A1* | 11/2013 | Toyota | ................... | B60L 11/14 |
| | | | | 701/22 |
| 2015/0088348 A1* | 3/2015 | Lee | ................... | B60W 10/11 |
| | | | | 701/22 |
| 2015/0149016 A1* | 5/2015 | Saitoh | ................... | B60K 6/485 |
| | | | | 701/22 |
| 2015/0266479 A1* | 9/2015 | Blakeway | ........... | B60W 50/082 |
| | | | | 477/92 |
| 2018/0118191 A1* | 5/2018 | Park | ................... | B60W 10/08 |

* cited by examiner

SYSTEM AND METHOD OF CONTROLLING SHIFT FOR HYBRID ELECTRIC VEHICLE

CROSS-REFERENCE TO RELATED APPLICATION

This application claims priority to and the benefit of Korean Patent Application No. 10-2016-0169807 filed in the Korean Intellectual Property Office on Dec. 13, 2016, the entire contents of which are incorporated herein by reference.

BACKGROUND

(a) Field of the Invention

The present invention relates to a system and a method of controlling a shift for a hybrid electric vehicle, and more particularly to a system and a method of controlling a shift for a hybrid electric vehicle controls the shift based on a transmission input torque generated using a shift start point and a shift finish point.

(b) Description of the Related Art

Due to demands for enhancement of fuel efficiency and reinforcement of exhaust gas regulations, eco-friendly vehicles are actively being researched. A hybrid electric vehicle is one type of such eco-friendly or environmentally-friendly vehicles. The hybrid electric vehicle category includes pure electric vehicles (EVs) using an electric motor as a power source and fuel cell electric vehicles (FCEV). The hybrid electric vehicle is different from other types of electric vehicles in that the hybrid electric vehicle receives power from more than two power sources including a drive motor and an engine. In this specification, it is to be understood that the hybrid electric vehicle means a vehicle provided with more than two power sources including the drive motor and the engine and includes a plug-in hybrid electric vehicle (PHEV) in a broad sense.

In particular, more than two power sources are combined in various ways in the hybrid electric vehicle. Currently, as the power source, a combination of a gasoline engine or a diesel engine using traditional fossil fuel and a drive motor driven by electrical energy is typically used. The hybrid electric vehicle provides a suitable output torque based on harmonization operation of the engine and the drive motor according to a driving condition. A transmission-mounted-electric-device (TMED) type provided with an automatic transmission (AT) or a dual clutch transmission (DCT) or a (flywheel-mounted-electric-device (FMED) type may be applied to the hybrid electric vehicle.

When a shift occurs when the hybrid electric vehicle is being driven, a hybrid control unit (HCU) is configured to adjust a torque during the shift using a vehicle speed, etc., and a transmission control unit (TCU) is configured to perform a release control of hydraulic pressure from off-going elements that achieve a current gear stage and a supply control of hydraulic pressure to on-coming elements that achieve a target gear stage by supplying hydraulic pressure to or exhausting hydraulic from at least one of clutches and brakes in a transmission according to a torque applied to the transmission in the shift, an engine revolutions per minute (RPM) at beginning of the shift, and engagement state of an engine clutch.

According to conventional arts, the HCU only calculates a target input torque into the transmission based on a position value of an accelerator pedal, the vehicle speed, etc., but does not receive feedback on an actual shift start point and operation of on-coming and off-going elements from the TCU. Therefore, acceleration feel in the shift may be deteriorated. Shock may occur due to deterioration of acceleration feel and a driver may feel displeasure.

The above information disclosed in this section is merely for enhancement of understanding of the background of the invention and therefore it may contain information that does not form the prior art that is already known in this country to a person of ordinary skill in the art.

SUMMARY

The present invention has provides a system and a method of controlling a shift for a hybrid electric vehicle having advantages of controlling the shift based on an input torque to a transmission generated using a shift start point and a shift finish point. An exemplary embodiment of the present invention provides a system and a method of controlling a shift for a hybrid electric vehicle having further advantages of controlling the shift cooperation with a HCU and a TCU.

A system of controlling a shift for a hybrid electric vehicle according to an exemplary embodiment of the present invention may include: an engine and a drive motor operating as power sources; a transmission configured to receive driving torque from at least one of the engine and the drive motor; a data detector configured to detect a state data for operating the transmission; and a vehicle controller configured to calculate a creep torque and an engine setting torque using the state data, determine whether a shift control condition is satisfied based on a position value of an accelerator pedal in the state data, calculate an available motor torque using a motor speed at an actual shift start point and a target motor speed when the shift control condition is satisfied, calculate a first shift input torque using the creep torque, the engine setting torque, the available motor torque, and a first torque apply ratio, and operate the transmission based on the first shift input torque.

The vehicle controller may be configured to determine whether a kick down shift is necessary based on the position value of the accelerator pedal, and calculate the first torque apply ratio using the motor speed at the actual shift start point, the target motor speed, and a change rate of the motor speed when the kick down shift is necessary. The vehicle controller may then be configured to operate the transmission based on the first shift input torque when the detected motor speed of the drive motor is less than the motor speed at the actual shift start point.

Further, the vehicle controller may be configured to calculate a second shift input torque using the creep torque, the engine setting torque, a motor setting torque, and a second torque apply ratio, and operate the transmission based on the second shift input torque when the detected motor speed is greater than the motor speed at the actual shift start point. The vehicle controller may be configured to calculate the second torque apply ratio using a motor speed change rate and a target motor speed change rate, and calculate the motor setting torque using the detected motor speed, a state of charge (SOC) of a battery, and an available power of the battery.

The vehicle controller may additionally be configured to calculate the creep torque using a gear stage engaged in the transmission, a vehicle speed, and a slope of a road, and calculate the engine setting torque using the gear stage engaged in the transmission, the vehicle speed, and an altitude. The vehicle controller may be configured to determine whether a lift foot up (LFU) shift is necessary based on the position value of the accelerator pedal, determine an in-foot release point using a motor speed at a shift start point, the target motor speed, and an out-going pressure when the lift foot up shift (e.g., disengagement) is necessary, calculate a third shift input torque using the creep torque or a predetermined value in a release region according to the in-foot release point (e.g., disengagement point), and operate the transmission based on the third shift input torque.

A method of controlling a shift for a hybrid electric vehicle according to another exemplary embodiment of the present invention may include: calculating a creep torque, a motor setting torque, and an engine setting torque using a state data; determining whether a shift control condition is satisfied based on a position value of an accelerator pedal included in the state data; calculating an available motor torque using a motor speed at an actual shift start point and a target motor speed when the shift control condition is necessary; calculating a first torque apply ratio using the motor speed at the actual shift start point, the target motor speed, and a motor speed change rate; calculating a first shift input torque using the creep torque, the engine setting torque, the available motor torque, and the first torque apply ratio; determining whether a detected motor speed is less than the motor speed at the actual shift start point; and operating a transmission based on the first shift input torque when the detected motor speed is less than the motor speed at the actual shift start point.

The calculation of the first torque apply ratio may include: calculating the motor speed change rate by subtracting the motor speed at the actual shift start point from the target motor speed; and calculating the first torque apply ratio using the motor speed at the actual shift start point, the target motor speed, and the motor speed change rate. The first shift input torque TM_1 may be calculated from the following equation:

$$TM\_1=TC+(A/100*((R \times C2)+TE)).$$

wherein, TC indicates the creep torque, A indicates the position value of the accelerator pedal, R indicates the first torque apply ratio, C2 indicates the available motor torque, and TE indicates the engine setting torque.

When the detected motor speed is greater than or equal to the motor speed of the actual shift start point, the method may further include: calculating a second torque apply ratio using the motor speed change rate and a target motor speed change rate; calculating a second shift input torque using the creep torque, the engine setting torque, the motor setting torque, and the second torque apply ratio; and operating the transmission based on the second shift input torque.

The second shift input torque TM_2 may be calculated from the following equation:

$$TM\_2=TC+(A/100*(S-(TD+TE)).$$

wherein, TC indicates the creep torque, A indicates the position value of the accelerator pedal, S indicates the second torque apply ratio, TD indicates the motor setting torque, and TE indicates the engine setting torque.

The determination of whether the shift control condition is satisfied may include determining whether a kick down shift is necessary based on the position value of the accelerator pedal. When the kick down shift is not necessary in the determination of whether the shift control condition is satisfied, the method may further include: determining whether a lift foot up shift is necessary based on the position value of the accelerator pedal; determining an in-foot release point using a motor speed at a shift begin point, the target motor speed, and an out-going pressure when the lift foot up shift is necessary; calculating a third shift input torque using the creep torque or a predetermined value; and operating the transmission based on the third shift input torque in a releasing region according to the in-foot release point.

When the lift foot up shift is not necessary, the method may further include: calculating a fourth shift input torque using the creep torque, the motor setting torque, and the engine setting torque; and operating the transmission based on the fourth shift input torque. The calculation of the creep torque, the motor setting torque, and the engine setting torque may include: calculating the creep torque using a gear stage engaged in the transmission, a vehicle speed, and a slope of a road; calculating the motor setting torque using the detected motor speed, an SOC of a battery, and an available power of the battery; and calculating the engine setting torque using the gear stage engaged in the transmission, the vehicle speed, and an altitude.

According to the exemplary embodiment of the present invention, shift duration may be decreased by operating a shift using an input torque into a transmission generated using a shift start point and a shift finish point. In addition, since the shift duration is decreased, energy loss may be reduced and fuel economy may be improved. Further, acceleration responsiveness and acceleration linearity may be improved, deterioration of acceleration feel in the shift may be prevented, and shock may be suppressed due to the shift. The effects which may be obtained or predicted by the exemplary embodiment of the present invention will be explicitly or implicitly disclosed in the detailed description of the exemplary embodiments of the present invention. In other words, various effects which are predicted by the exemplary embodiments of the present invention will be disclosed in the detailed description to be described below.

BRIEF DESCRIPTION OF THE DRAWINGS

The above and other objects, features and advantages of the present invention will be more apparent from the following detailed description taken in conjunction with the accompanying drawings.

DESCRIPTION OF SYMBOLS

Figure 1:
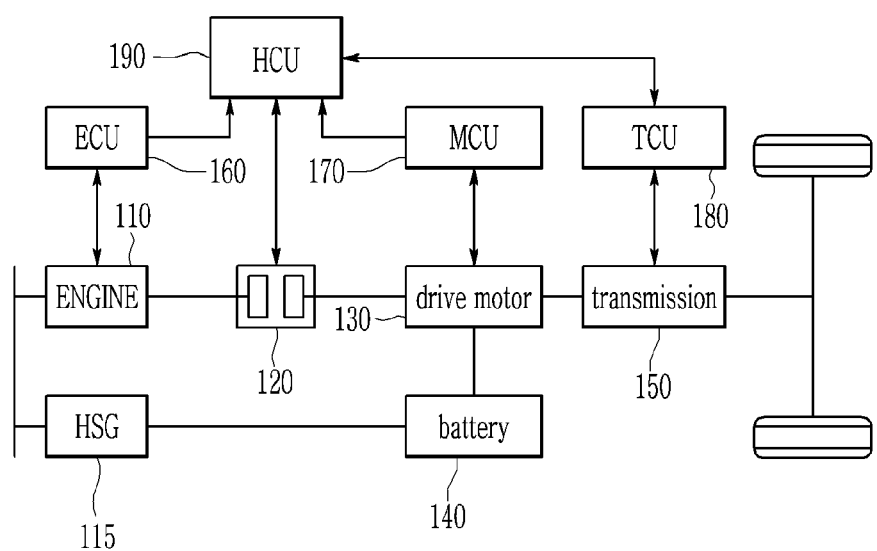
FIG. 1 is a diagram illustrating main constituent elements of a hybrid electric vehicle to which a system of controlling a shift according to an exemplary embodiment of the present invention is applicable.

110: engine
115: HSG
120: engine clutch
130: drive motor
140: battery

150: transmission
210: data detector
250: vehicle controller

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an operating principle of a system and a method of controlling motor temperature for an environmentally-friendly car according to an exemplary embodiment of the present invention will be described with reference to accompanying drawings. However, the following illustrated drawings and the detailed description to be described below relate to one exemplary embodiment among several exemplary embodiments for effectively describing features of the present invention. Therefore, the present invention is not limited to the following drawings and the description.

Further, in describing below exemplary embodiments of the present invention, well-known functions or constructions will not be described in detail since they may unnecessarily obscure the understanding of the present invention. Further, the following terminologies are defined in consideration of the functions in the present invention and may be construed in different ways by the intention of users and operators, practice, or the like. Therefore, the definitions thereof should be construed based on the contents throughout the specification. Further, to effectively describe core technical features of the present invention, terms may be appropriately changed, integrated, or separated for those skilled in the art in a technical field to which the present invention belongs to explicitly understand the present invention, but the present invention is not limited thereto.

Hereinafter, one exemplary embodiment of the present invention will be described in detail with reference to the accompanying drawings. FIG. 1 is a diagram illustrating main constituent elements of a hybrid electric vehicle to which a system of controlling a shift according to an exemplary embodiment of the present invention is applicable.

Referring to FIG. 1, a hybrid electric vehicle to which a system of controlling a shift according to an exemplary embodiment of the present invention is applicable may include an engine 110, a hybrid integrated starter-generator (it will hereinafter be called 'HSG'), an engine clutch 120, a drive motor 130, a battery 140, a transmission 150, an engine controller 160 (it will hereinafter be called 'ECU'), a motor controller 170 (it will hereinafter be called 'MCU'), a transmission controller 180 (it will hereinafter be called 'TCU') and a hybrid controller 190 (it will hereinafter be called 'HCU').

The engine 110 burns fuel to generate power. In other words, the engine 110 may be any one of well-known various engines such as a gasoline engine and a diesel engine, etc. using a typical fossil fuel. Power of the engine 110 may be transmitted toward the transmission 150. The HSG 115 may be configured to start the engine 110 or may be configured to operate as a generator to generate electrical energy when the engine 110 is operated.

The engine clutch 120 is disposed between the engine 110 and the drive motor 130 and may be operated by control of the HCU 190 to operably connect or disconnect the engine 110 and the drive motor 130. In other words, the engine clutch 120 may be configured to operably connect or disconnect the engine 110 and the drive motor 130 based on switching between EV mode and HEV mode. The drive motor 130 may be operated by three-phase alternating current (AC) voltage supplied from the battery 140 through an inverter (not shown) to generate torque. The drive motor 130 may be operated as a generator to supply regenerative energy to the battery 140 in coasting or regenerative braking.

The battery 140 may include a plurality of unit cells, and high voltage for supplying driving voltage to the drive motor 130 may be stored in the battery 140. The battery 140 may be configured to supply the driving voltage to the drive motor 130 at the EV mode or the HEV mode, and may be charged by voltage generated in the drive motor 130 during the regenerative braking. The transmission 150 may be configured to receive output torque of the engine 110 when engaging the engine clutch 120 or output torque of the drive motor 130, and change the output torque of the engine 110 and/or the output torque of drive motor 130 into target torque. In other words, a suitable gear stage may be selected based on a vehicle speed and a driving condition and the received output torque may be changed into the target torque. Then, the vehicle may be driven by outputting the changed target torque to a driving wheel as the driving torque.

The ECU 160 may be connected with the HCU 190 in a wire or wireless manner, and may be configured to execute, together with the HCU 190, overall operations of the engine 110 based on a demand torque signal of a driver and operating state of the engine such as a coolant temperature, an engine speed, a throttle valve opening, an intake amount, an oxygen amount, an engine torque, etc. The ECU 160 may be configured to transmit the operating state of the engine 110 to the HCU 190. The MCU 170 may be configured to operate the drive motor 130 and adjust the torque thereof by control of the HCU 190, and may be configured to store voltage generated by the drive motor 130 during the regenerative braking in the battery 140. The MCU 170 may be configured to execute overall operation of the driver motor based on demand torque signal of the driver, running mode of the vehicle and state of charge (SOC) of the battery 140.

The TCU 180 may be configured to adjust a gear ratio based on output signals of the ECU 160 and the MCU 170 and determine regenerative braking amount. In other words, The TCU 180 may be configured to execute overall operation of the transmission 150. In particular, the TCU 180 may be configured to transmit an operating state of the transmission 150 to the HCU 190. The HCU 190 may operate as a top rank controller configured to determine running mode of the vehicle and execute overall operation of the vehicle. The HCU 200 may be configured to operate the low rank controllers connected via a network. For example, the HCU 200 may be connected to the low rank controllers via a controller area network (CAN). The HCU 200 may be configured to gather and analyze information of the low rank controllers and adjust the output torques of the engine 110 and/or the drive motor 130 cooperatively with the low rank controllers. Since general operation of the hybrid electric vehicle according to the exemplary embodiment of the present invention supporting the above-mentioned functions is the same as or is similar to that of a conventional hybrid electric vehicle, detailed description thereof will be omitted.

Figure 2:
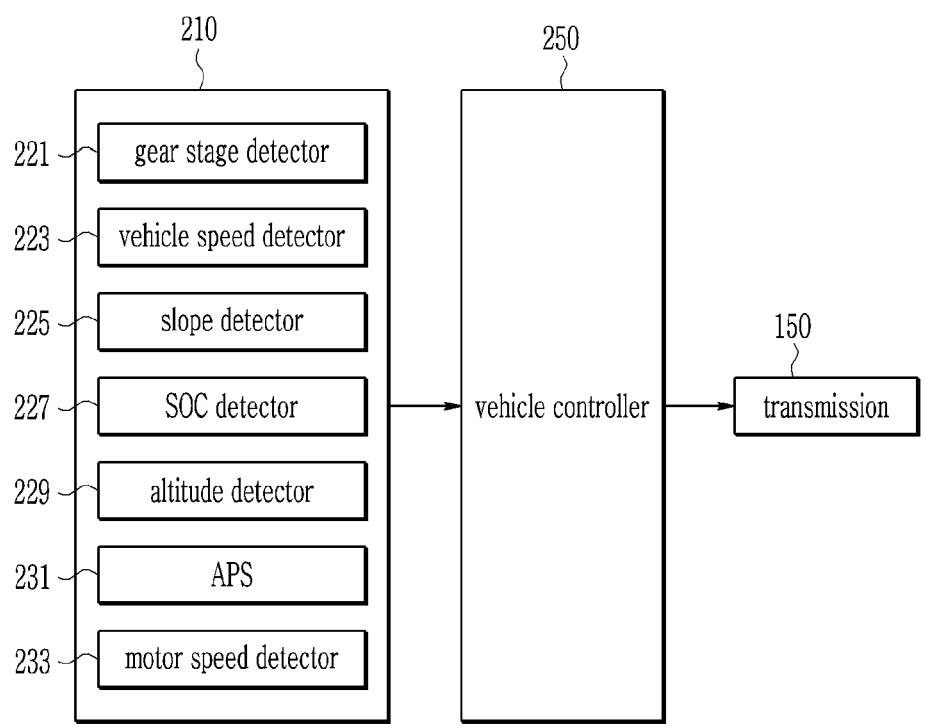
FIG. 2 is a block diagram of a system of controlling a shift for a hybrid electric vehicle according to an exemplary embodiment of the present invention.

FIG. 2 is a block diagram of a system of controlling a shift for a hybrid electric vehicle according to an exemplary embodiment of the present invention. Some steps of a method of controlling a shift according to the exemplary embodiment of the present invention may be performed by the TCU 180 and other steps thereof may be performed by the HCU 190. Since, the MCU 170, the TCU 180, and the HCU 190 may be embodied as one vehicle controller 250 according to the exemplary embodiment of the present invention, for convenience of description, the MCU 170, the TCU 180, and the HCU 190 will be referred to as the vehicle controller 250, unless explicitly described otherwise in this specification and claims.

Referring to FIG. 2, the system of controlling a shift for a hybrid electric vehicle may include the transmission 150, a data detector 210, and the vehicle controller 250. The transmission 150 may be configured to receive a driving torque from at least one of the engine 110 and the drive motor 130 based on an engagement and release of the engine clutch 120, and may be configured to provide the received driving torque to a driving wheel. The data detector 210 which may be a sensor may be configured to detect a state data for adjusting the shift. Accordingly, the data detector 210 may include a gear stage detector 221, a vehicle speed detector 223, a slope detector 225, an SOC detector 227, an altitude detector 229, an accelerator position sensor (APS) 231, and a motor speed detector 233. The various detectors may each be a sensor all configured to communicate with a central sensor, the data detector 210.

Particularly, the gear stage detector 221 may be configured to detect a gear stage currently engaged in the transmission 150 and transmit the detected gear stage to the vehicle controller 250. The vehicle speed detector 223 may be configured to detect a vehicle speed. The vehicle speed detector 223 may then be configured to transmit the detected vehicle speed to the vehicle controller 250. The vehicle speed detector 223 may be mounted at the drive wheel of the vehicle. When the vehicle speed detector 213 is not provided, the vehicle controller 250 may be configured to calculate the vehicle speed using a global positioning system (GPS) signal received from a GPS. The slope detector 225 may be configured to sense, detect, or measure a slope of a road on which the vehicle is positioned and transmit the detected slope to the vehicle controller 250. The SOC detector 227 may be configured to detect the SOC of the battery 140 and transmit the detected SOC of the battery to the vehicle controller 250. The altitude detector 229 may be configured to detect an altitude of the road on which the vehicle is positioned and transmit the detected altitude to the vehicle controller 250.

The APS 231 may be configured to detect an engagement amount on an accelerator pedal. In other words, the APS 231 may be configured to detect a position value of the accelerator pedal (e.g., how much the accelerator pedal is pressed or engaged or how much pressure is exerted onto the pedal) and transmit a signal that corresponds to the detected position value to the vehicle controller 250. When the accelerator pedal is completely pressed or engaged, the position value of the accelerator pedal is 100%, and when the accelerator pedal is disengaged, the position value of the accelerator pedal is 0%. Instead of using the APS 231, a throttle valve opening sensor mounted on an intake passage may be used. Further, the motor speed detector 233 may be configured to detect a rotation speed of the drive motor 130 (e.g., motor speed) and transmit the detected motor speed to the vehicle controller 250. The vehicle controller 250 may be configured to operate the transmission 150 and the data detector 210 that are constituent elements of the system of controlling a shift for a hybrid electric vehicle.

The vehicle controller 250 may be configured to receive the state data from the data detector 210 and calculate a creep torque, an engine setting torque, and a motor setting torque using the state data. The vehicle controller 250 may then be configured to determine whether a shift control condition is satisfied based on the position value of the accelerator pedal detected by the APS 231, and calculate an available motor torque and a first torque apply ratio when the shift control condition is satisfied. The vehicle controller 250 may be configured to calculate a first shift input torque using the creep torque, the engine setting torque, the available motor torque, and the first torque apply ratio. The vehicle controller 250 may further be configured to operate the transmission 150 based on the first shift input torque.

Accordingly, the vehicle controller 250 may be implemented by at least one processor operated by a predetermined program and the predetermined program may be programmed to perform each step of a method of controlling a shift according to an exemplary embodiment of the present invention. The method of controlling a shift for a hybrid electric vehicle will be described in detail with reference to FIG. 3 to FIG. 5.

The method of controlling a shift for a hybrid electric vehicle will be described in detail with reference to FIG. 3 to FIG. 5. It will be exemplified in this specification that the exemplary embodiment of the present invention is applied to a kick down shift and a lift foot up shift. It is to be understood that the exemplary embodiment of the present invention may be applied to other shifts other than the kick down shift and the lift foot up shift such as an upshift, a wide open throttle (WOT) shift, etc.

Figure 3:
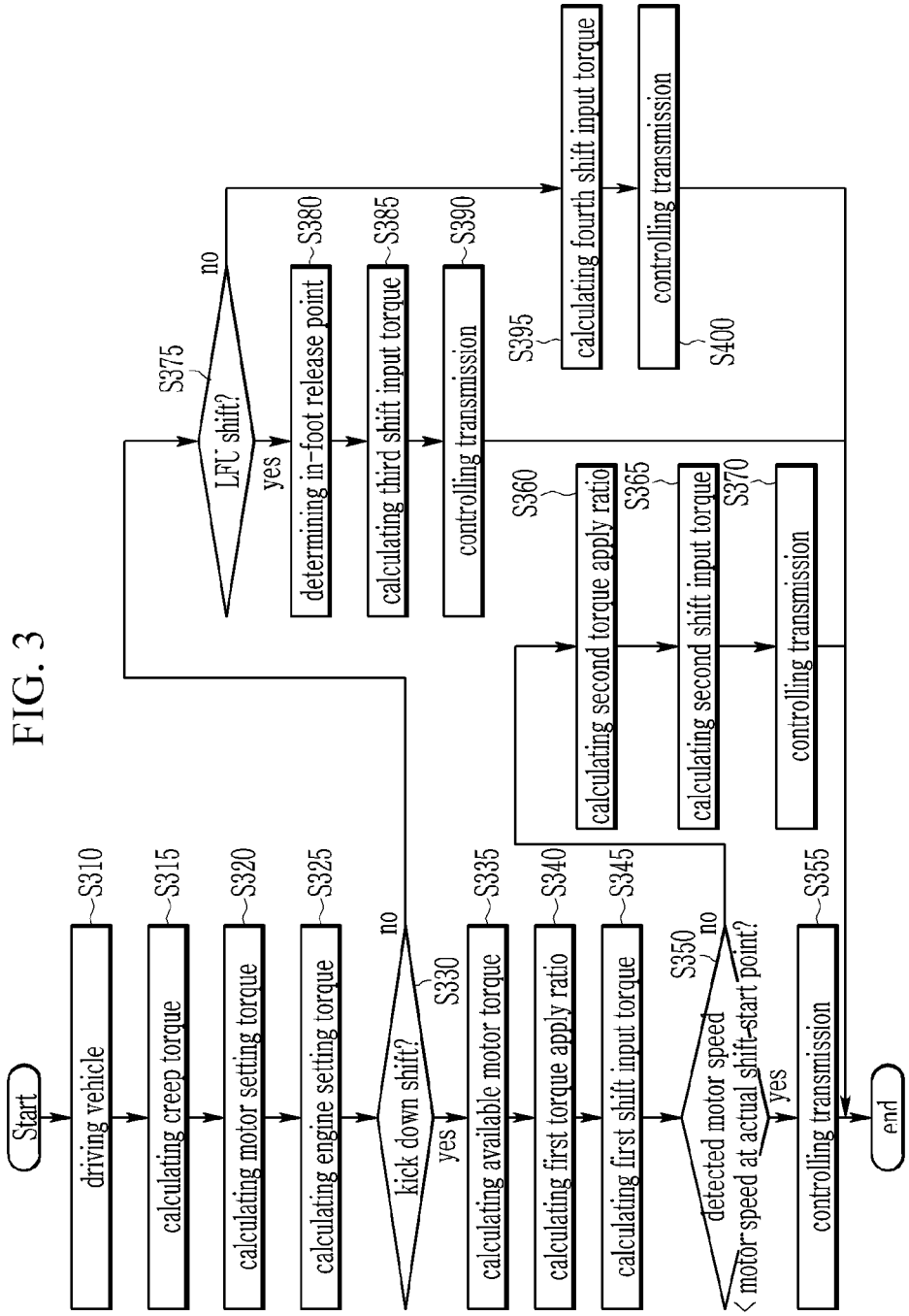
FIG. 3 is a flowchart of a method of controlling a shift for a hybrid electric vehicle according to an exemplary embodiment of the present invention.

FIG. 3 is a flowchart of a method of controlling a shift for a hybrid electric vehicle according to an exemplary embodiment of the present invention. Referring to FIG. 3, the vehicle controller 250 may be configured to operate the vehicle according to demand of the driver at step S310. In other words, the vehicle controller 250 may be configured to confirm the demand of the driver based on the state data and drive the vehicle by operating the engine 110 and/or the drive motor 130 based on the demand of the driver.

The vehicle controller 250 may be configured to calculate the creep torque using the state data at step S315. In other words, the vehicle controller 250 may be configured to calculate the creep torque using the gear stage currently engaged in the transmission 150, the vehicle speed, and/or the slope of the road. Particularly, the creep torque refers to a torque necessary in creep driving (e.g., the vehicle drives without engagement of the accelerator pedal) of the hybrid electric vehicle. The vehicle controller 250 may be configured to calculate the motor setting torque using the state data at step S320. In other words, the vehicle controller 250 may be configured to calculate the motor setting torque using the motor speed of the drive motor 130, the SOC of the battery 140, and the available power of the battery 140. The motor setting torque indicates a maximum torque capable of being output by the drive motor 130.

Furthermore, the vehicle controller 250 may be configured to calculate the engine setting torque using the state data at step S325. In other words, the vehicle controller 250 may be configured to calculate the engine setting torque using the gear stage engaged in the transmission 150, the vehicle speed, and the altitude. The engine setting torque is a maximum torque capable of being output by the engine. The vehicle controller 250 may be configured to determine whether the kick down shift is necessary based on the position value of the accelerator pedal at step S330. In particular, the vehicle controller 250 may be configured to receive the position value of the accelerator pedal from the APS 231 and determine whether the kick down shift is necessary based on the position value of the accelerator pedal and the vehicle speed. For example, the vehicle controller 250 may be configured to determine that the kick down shift is necessary when a position change of the accelerator pedal is greater than a predetermined value according to the current vehicle speed, but the determination is not limited thereto.

The vehicle controller 250 may be configured to calculate an available motor torque when the kick down shift is necessary at step S335. In other words, the vehicle controller 250 may be configured to calculate the available motor torque using a motor speed at an actual shift start point and a target motor speed. The motor speed at the actual shift start point, as shown in FIG. 4, indicates a motor speed of the drive motor 130 at a time T1 where the transmission 150 actually begins to perform a shift control, and the target motor speed indicates a motor speed of the drive motor 130 for shifting to a target gear stage.

The vehicle controller 250 may be configured to calculate a first torque apply ratio at step S340. In other words, the vehicle controller 250 may be configured to calculate the first torque apply ratio using the motor speed at the actual shift start point, the target motor speed, and a motor speed change rate. Particularly, the motor speed change rate refers to a speed change rate between the target motor speed and the motor speed of the actual shift start point. The motor speed change rate is represented as D in FIG. 4. The larger the motor speed change rate is, the shorter actual shift duration is and the faster the target gear stage is achieved.

Moreover, the vehicle controller 250 may be configured to calculate a first shift input torque at step S345. In other words, the vehicle controller 250 may be configured to calculate the first shift input torque based on the creep torque, the engine setting torque, the available motor torque, and the first torque apply ratio. In particular, the vehicle controller 250 may be configured to calculate the first shift input torque using Equation 1 shown below.

$$TM\_1 = TC + (A/100 * ((R \times C2) + TE)) \quad \text{Equation 1}$$

wherein, TM_1 indicates the first shift input torque, TC indicates the creep torque, A indicates the position value of the accelerator pedal, R indicates the first torque apply ratio, C2 indicates the available motor torque, and TE indicates the engine setting torque.

The vehicle controller 250 may be configured to determine whether the detected motor speed is less than the motor speed at the actual shift start point at step S350. In other words, the vehicle controller 250 may be configured to determine whether the current motor speed of the drive motor 130 is less than the motor speed at the time where the shift actually begins to be performed. When the detected motor speed is less than the motor speed at the actual shift start point, the vehicle controller 250 may be configured to operate the transmission 150 based on the first shift input torque at step S355.

Meanwhile, when the detected motor speed is greater than or equal to the motor speed at the actual shift start point, the vehicle controller 250 may be configured to calculate a second torque apply ratio at step S360. In other words, the vehicle controller 250 may be configured to calculate the second torque apply ratio using the motor speed change rate and a target motor speed change rate. The target motor speed change rate refers to a motor speed change rate of the drive motor 130 necessary to shift from the currently engaged gear stage to the target gear stage, and is represented as DT in FIG. 4.

The vehicle controller 250 may be configured to calculate a second shift input torque using the second torque apply ratio at step S365. In other words, the vehicle controller 250 may be configured to calculate the second shift input torque using the creep torque, the engine setting torque, the motor setting torque, and the second torque apply ratio. In particular, the vehicle controller 250 may be configured to calculate the second shift input torque using Equation 2 shown below.

$$TM\_2 = TC + (A/100 * (S \times (TD + TE))) \quad \text{Equation 2}$$

wherein, TM_2 indicates the second shift input torque, TC indicates the creep torque, A indicates the position value of the accelerator pedal, S indicates the second torque apply ratio, TD indicates the motor setting torque, and TE indicates the engine setting torque.

The vehicle controller 250 may then be configured to operate the transmission 150 based on the second shift input torque at step S370. Meanwhile, when the kick down shift is not necessary, the vehicle controller 250 may be configured to determine whether the lift foot up (LFU) shift is necessary based on the position value of the accelerator pedal at step S375. In other words, the vehicle controller 250 may be configured to determine whether the lift foot up shift is necessary by monitoring the position value of the accelerator pedal and determining whether the position value is 0%.

When the lift foot up shift is necessary, the vehicle controller 250 may be configured to determine an in-foot release point at step S380. In other words, vehicle controller 250 may be configured to determine the in-foot release point using a motor speed at a shift begin point, the target motor speed, and an out-going pressure. Particularly, the motor speed at the shift start point indicates a motor speed of the drive motor 130 at a time where the shift begins, and the target motor speed indicates a motor speed of the drive motor 130 for performing the lift foot up shift. The out-going pressure, which is represented as A2 in FIG. 5, refers to a hydraulic pressure that will be released at the current gear stage. The in-foot release point refers to a time where an in-foot speed control is terminated and is represented as T1-2 in FIG. 5.

The vehicle controller 250 may further be configured to calculate a third shift input torque at step S385. In other words, the vehicle controller 250 may be configured to execute the shift in a region Q1 from the actual shift start point to the in-foot release point by adjusting the motor speed of the drive motor 130, and may be configured to calculate the third shift input torque using the creep torque or a predetermined value in a release region Q2 continuing from the in-foot release point. The predetermined value is a torque that will be input to the transmission 150 at the in-foot release point and may be 0.

Furthermore, the vehicle controller 250 may be configured to operate the transmission 150 based on the third shift input torque at step S390. However, when the lift foot up shift is not necessary, the vehicle controller 250 may be configured to calculate a fourth shift input torque at step S395. In other words, the vehicle controller 250 may be configured to calculate the fourth shift input torque using the creep torque, the motor setting torque, and the engine setting torque. In particular, the vehicle controller 250 may be configured to calculate the fourth shift input torque using Equation 3 shown below.

$$TM\_4 = TC + (A/100*(TD+TE)) \quad \text{Equation 3}$$

wherein, TM_4 indicates the fourth shift input torque, TC indicates the creep torque, A indicates the position value of the accelerator pedal, TD indicates the motor setting torque, and TE indicates the engine setting torque. The vehicle controller 250 may then be configured to operate the transmission 150 based on the fourth shift input torque at step S400.

Figure 4:
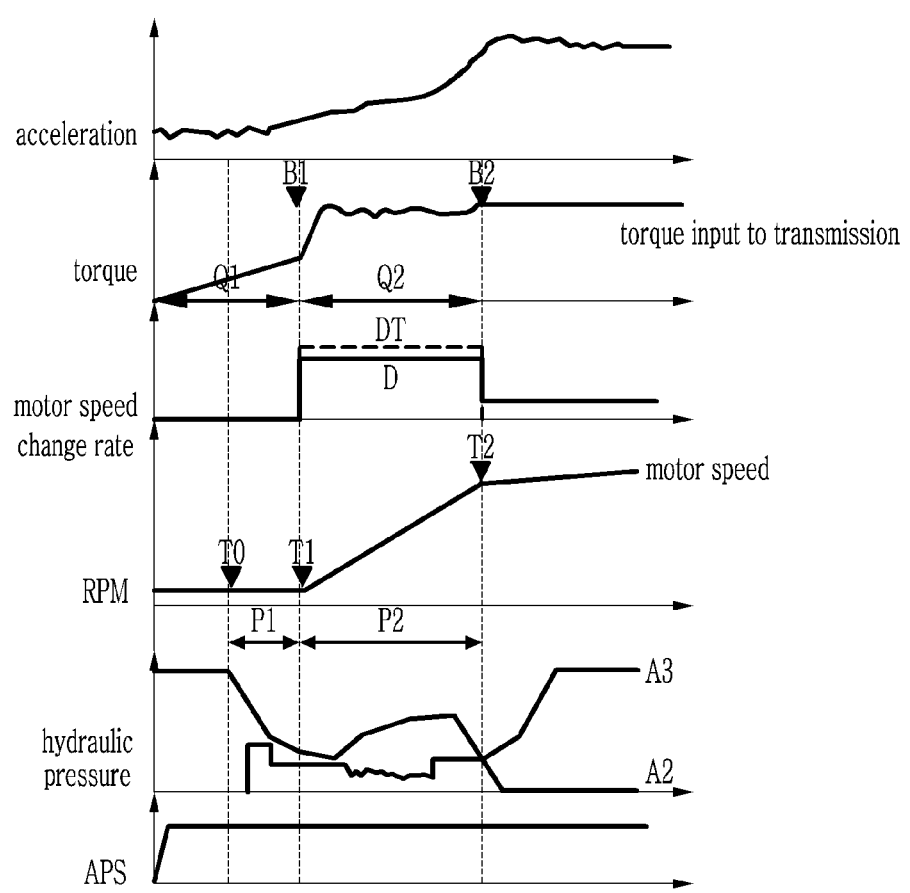
FIG. 4 is a graph illustrating acceleration, torque, etc. when a method of controlling a shift for a hybrid electric vehicle according to an exemplary embodiment of the present invention is applied to a kick down shift.

FIG. 4 is a graph illustrating acceleration, torque, etc. when a method of controlling a shift for a hybrid electric vehicle according to an exemplary embodiment of the present invention is applied to a kick down shift. As shown in FIG. 4, the out-going pressure A2 indicates a hydraulic pressure that will be released at the current gear stage, and an on-coming pressure A3 indicates a hydraulic pressure that will be supplied to shift to the target gear stage.

A region of the out-going pressure A2 may be divided into two sub-regions. A first region is a region from the shift start point T0 to the actual shift start point T1, and is referred to as a release region P1 where the hydraulic pressure is decreased. A second region is a region from the actual shift start point T1 to a time T2 where the motor speed of the drive motor 130 reaches the target motor speed, and is referred to as a back pressure control region P2. To maintain linearity of the motor speed, the out-going pressure may be increased in the back pressure control region P2.

A first shift torque B1 refers to a torque input to the transmission 150 at the actual shift start point T1, and a second shift torque B2 refers to a torque input to the transmission 150 at the time T2 where the motor speed of the drive motor 130 reaches the target motor speed. A shift begin region Q1 refers to a preparation region for shifting in the transmission 150. An actual shift region Q2 refers to a region where the shift is actually performed. In other words, acceleration of the hybrid electric vehicle and the motor speed change rate D change according to adjustment of the first shift torque B1, a torque in the actual shift region Q2, and the out-going pressure A2.

Figure 5:
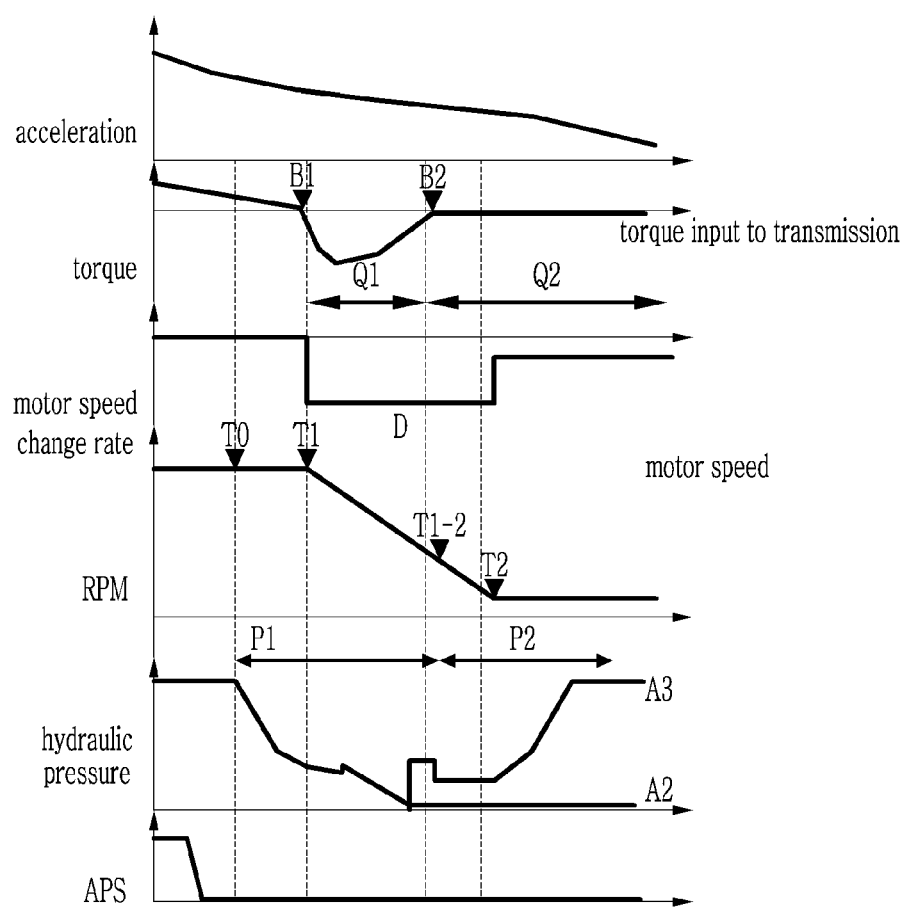
FIG. 5 is a graph illustrating acceleration, torque, etc. when a method of controlling a shift for a hybrid electric vehicle according to an exemplary embodiment of the present invention is applied to a lift foot up shift.

FIG. 5 is a graph illustrating acceleration, torque, etc. when a method of controlling a shift for a hybrid electric vehicle according to an exemplary embodiment of the present invention is applied to a lift foot up shift. As shown in FIG. 5, the motor speed change rate D refers to a ratio of speed change of the drive motor 130 between the actual shift start point T1 and the time T2 where the motor speed of the drive motor 130 reaches the target motor speed.

The in-foot release point T1-2 may be set using the motor speed at the actual shift start point T1, the target motor speed of the drive motor 130, and the out-going pressure A2. The motor speed change rate D changes based on the torque input to the transmission 150 in the shift begin region Q1. The larger the absolute value of the motor speed change rate D is, the faster the motor speed reaches the target motor speed. When the motor speed of the drive motor 130 approaches the target motor speed, the on-coming pressure A3 is applied. At this time, it is preferable that the torque does not change.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A system of controlling a shift for a hybrid electric vehicle, comprising:
   an engine and a drive motor operating as power sources;
   a transmission configured to receive driving torque from at least one of the engine and the drive motor;
   a data detector configured to detect a state data for operating the transmission; and
   a vehicle controller configured to calculate a creep torque and an engine setting torque using the state data, determine whether a shift control condition is satisfied based on a position value of an accelerator pedal in the state data, calculate an available motor torque using a motor speed at an actual shift start point and a target motor speed when the shift control condition is satisfied, calculate a first shift input torque using the creep torque, the engine setting torque, the available motor torque, and a first torque apply ratio, and operate the transmission based on the first shift input torque.

2. The system of claim 1, wherein the vehicle controller is configured to determine whether a kick down shift is necessary based on the position value of the accelerator pedal, and calculate the first torque apply ratio using the motor speed at the actual shift start point, the target motor speed, and a change rate of the motor speed when the kick down shift is necessary.

3. The system of claim 1, wherein the vehicle controller is configured to operate the transmission based on the first shift input torque when the detected motor speed of the drive motor is less than the motor speed at the actual shift start point.

4. The system of claim 1, wherein the vehicle controller is configured to calculate a second shift input torque using the creep torque, the engine setting torque, a motor setting torque, and a second torque apply ratio, and operate the transmission based on the second shift input torque when the detected motor speed is greater than or equal to the motor speed at the actual shift start point.

5. The system of claim 4, wherein the vehicle controller is configured to calculate the second torque apply ratio using a motor speed change rate and a target motor speed change rate, and calculate the motor setting torque using the detected motor speed, a state of charge (SOC) of a battery, and an available power of the battery.

6. The system of claim 1, wherein the vehicle controller is configured to calculate the creep torque using a gear stage engaged in the transmission, a vehicle speed, and a slope of a road, and calculate the engine setting torque using the gear stage engaged in the transmission, the vehicle speed, and an altitude.

7. The system of claim 1, wherein the vehicle controller is configured to determine whether a lift foot up (LFU) shift is necessary based on the position value of the accelerator pedal, determine an in-foot release point using a motor speed at a shift begin point, the target motor speed, and an out-going pressure when the lift foot up shift is necessary, calculate a third shift input torque using the creep torque or a predetermined value in a release region according to the in-foot release point, and operate the transmission based on the third shift input torque.

8. A method of controlling a shift for a hybrid electric vehicle, comprising:
   calculating, by a vehicle controller, a creep torque, a motor setting torque, and an engine setting torque using a state data;
   determining, by the vehicle controller, whether a shift control condition is satisfied based on a position value of an accelerator pedal included in the state data;
   calculating, by the vehicle controller, an available motor torque using a motor speed at an actual shift start point and a target motor speed when the shift control condition is necessary;
   calculating, by the vehicle controller, a first torque apply ratio using the motor speed at the actual shift start point, the target motor speed, and a motor speed change rate;
   calculating, by the vehicle controller, a first shift input torque using the creep torque, the engine setting torque, the available motor torque, and the first torque apply ratio;
   determining, by the vehicle controller, whether a detected motor speed is less than the motor speed at the actual shift start point; and
   operating, by the vehicle controller, a transmission based on the first shift input torque when the detected motor speed is less than the motor speed at the actual shift start point.

9. The method of claim 8, wherein the calculation of the first torque apply ratio includes:

calculating, by the vehicle controller, the motor speed change rate by subtracting the motor speed at the actual shift start point from the target motor speed; and
calculating, by the vehicle controller, the first torque apply ratio using the motor speed at the actual shift start point, the target motor speed, and the motor speed change rate.

10. The method of claim 8, wherein the first shift input torque $TM\_1$ is calculated using an equation:

$$TM\_1 = TC + (A/100*((R \times C2) + TE)),$$

wherein TC indicates the creep torque, A indicates the position value of the accelerator pedal, R indicates the first torque apply ratio, C2 indicates the available motor torque, and TE indicates the engine setting torque.

11. The method of claim 8, when the detection of whether the motor speed is greater than or equal to the motor speed of the actual shift start point, further includes:
   calculating, by the vehicle controller, a second torque apply ratio using the motor speed change rate and a target motor speed change rate;
   calculating, by the vehicle controller, a second shift input torque using the creep torque, the engine setting torque, the motor setting torque, and the second torque apply ratio; and
   operating, by the vehicle controller, the transmission based on the second shift input torque.

12. The method of claim 11, wherein the second shift input torque $TM\_2$ is calculated using equation:

$$TM\_2 = TC + (A/100*(S \times (TD + TE)),$$

wherein TC indicates the creep torque, A indicates the position value of the accelerator pedal, S indicates the second torque apply ratio, TD indicates the motor setting torque, and TE indicates the engine setting torque.

13. The method of claim 8, wherein the determining whether the shift control condition is satisfied includes determining, by the vehicle controller, whether a kick down shift is necessary based on the position value of the accelerator pedal.

14. The method of claim 13, when the kick down shift is not necessary in the determining whether the shift control condition is satisfied, further includes:
   determining, by the vehicle controller, whether a lift foot up shift is necessary based on the position value of the accelerator pedal;
   determining, by the vehicle controller, an in-foot release point using a motor speed at a shift start point, the target motor speed, and an out-going pressure when the lift foot up shift is necessary;
   calculating, by the vehicle controller, a third shift input torque using the creep torque or a predetermined value; and
   operating, by the vehicle controller, the transmission based on the third shift input torque in a releasing region according to the in-foot release point.

15. The method of claim 14, when the lift foot up shift is not necessary, further includes:
   calculating, by the vehicle controller, a fourth shift input torque using the creep torque, the motor setting torque, and the engine setting torque; and
   operating, by the vehicle controller, the transmission based on the fourth shift input torque.

16. The method of claim 8, wherein the calculation of the creep torque, the motor setting torque, and the engine setting torque includes:

calculating, by the vehicle controller, the creep torque using a gear stage engaged in the transmission, a vehicle speed, and a slope of a road;

calculating, by the vehicle controller, the motor setting torque using the detected motor speed, a state of charge (SOC) of a battery, and an available power of the battery; and calculating, by the vehicle controller, the engine setting torque using the gear stage engaged in the transmission, the vehicle speed, and an altitude.

* * * * *